(12) United States Patent
Champion et al.

(10) Patent No.: US 11,913,856 B2
(45) Date of Patent: Feb. 27, 2024

(54) DIFFERENTIAL PRESSURE SENSOR AND DETECTION DEVICE COMPRISING SUCH A SENSOR

(71) Applicant: ATEQ, Les Clayes-sous-Bois (FR)

(72) Inventors: Cédric Champion, Les Clayes-sous-Bois (FR); Christophe Lemartinel, Les Clayes-sous-Bois (FR)

(73) Assignee: ATEQ, Les Clayes-sous-Bois (FR)

( * ) Notice: Subject to any disclaimer, the term of this patent is extended or adjusted under 35 U.S.C. 154(b) by 47 days.

(21) Appl. No.: 17/763,640

(22) PCT Filed: Sep. 25, 2020

(86) PCT No.: PCT/EP2020/076894
§ 371 (c)(1),
(2) Date: Mar. 24, 2022

(87) PCT Pub. No.: WO2021/058738
PCT Pub. Date: Apr. 1, 2021

(65) Prior Publication Data
US 2022/0334021 A1    Oct. 20, 2022

(30) Foreign Application Priority Data

Sep. 26, 2019  (FR) ..................................... 1910654

(51) Int. Cl.
*G01M 3/26* (2006.01)
*G01L 9/00* (2006.01)
*G01L 13/02* (2006.01)
*G01L 19/00* (2006.01)
*G01L 19/14* (2006.01)

(52) U.S. Cl.
CPC ............. *G01M 3/26* (2013.01); *G01L 9/0072* (2013.01); *G01L 13/025* (2013.01)

(58) Field of Classification Search
CPC .. G01M 3/00; G01M 3/26; G01L 9/00; G01L 9/0072; G01L 9/12; G01L 13/00; G01L 13/02; G01L 13/025; G01L 19/00; G01L 19/14
See application file for complete search history.

(56) References Cited

U.S. PATENT DOCUMENTS

| 2,751,530 A | 6/1956 | Armstrong |
| 5,623,102 A | 4/1997 | Arndt et al. |
| 9,638,546 B2 * | 5/2017 | Trainoff ................... G01D 5/12 |

FOREIGN PATENT DOCUMENTS

| EP | 1333264 A1 * | 8/2003 | ............. G01L 19/14 |
| FR | 2607927 | 6/1986 | |
| FR | 2849193 | 6/2004 | |
| GB | 2127971 | 4/1984 | |

* cited by examiner

*Primary Examiner* — Nguyen Q. Ha
(74) *Attorney, Agent, or Firm* — Dierker & Kavanaugh, P.C.

(57) ABSTRACT

The present invention relates to a differential pressure sensor for a leak detection device comprising:
  at least two bodies in which a cavity is created;
  a membrane that is arranged between the two bodies and separates said cavity so as to define a test chamber in each one of said bodies;
  at least one electrode arranged in each one of the test chambers and facing said membrane so as to form therewith a capacitor;
characterised in that said sensor comprises at least two seals arranged between each of said bodies and the membrane.

11 Claims, 3 Drawing Sheets

[Fig 1]
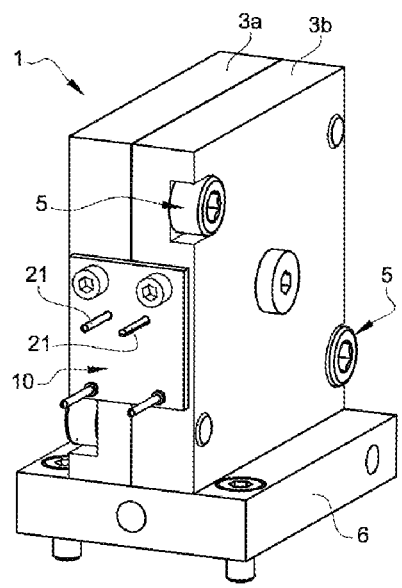
[Fig 2]
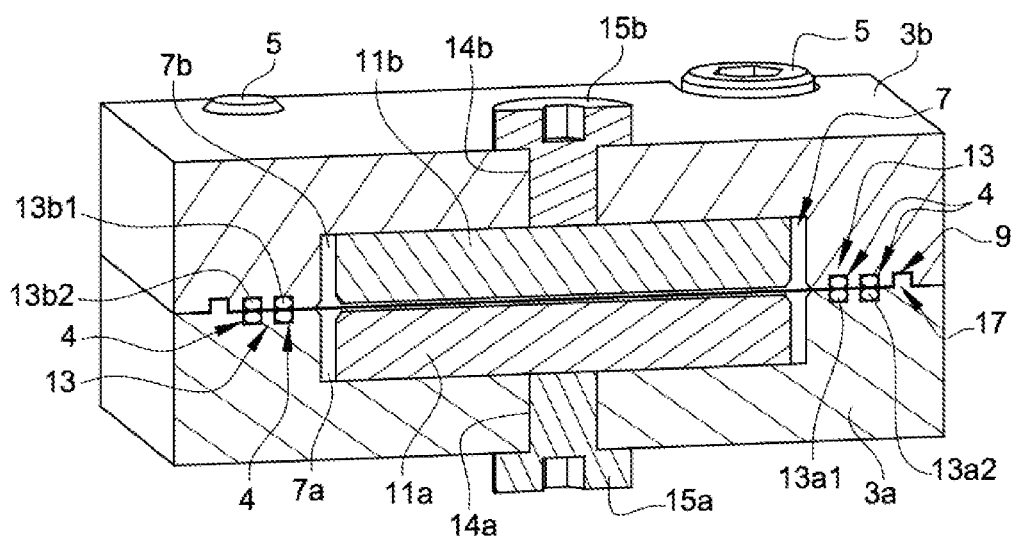

[Fig 3]
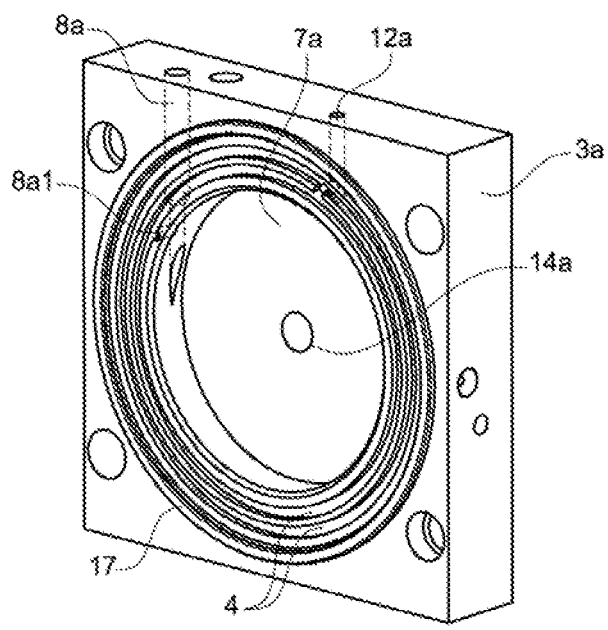
[Fig 4]
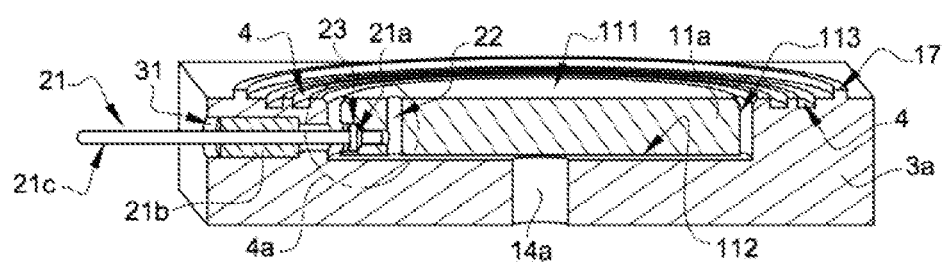

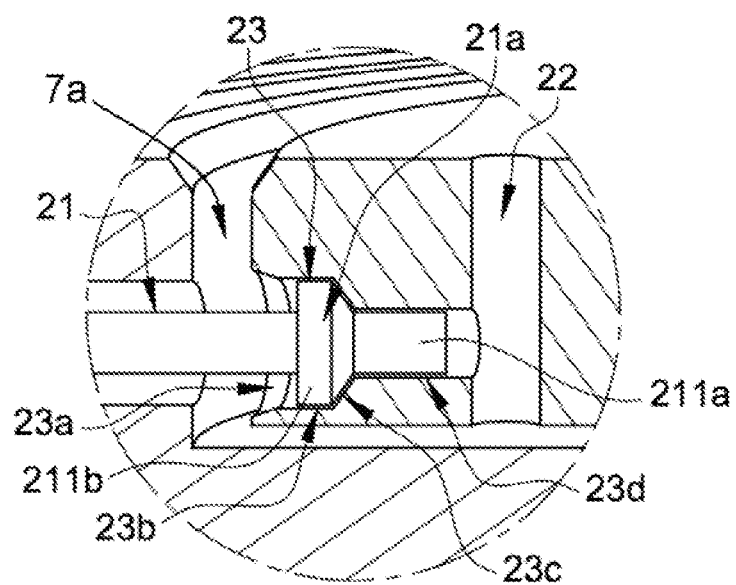
[Fig 4a]

DIFFERENTIAL PRESSURE SENSOR AND DETECTION DEVICE COMPRISING SUCH A SENSOR

TECHNICAL FIELD

The present invention relates to the field of devices for detecting leaks or measuring tightness. More particularly, the present invention relates to a differential pressure sensor intended to be mounted in such a device.

PRIOR ART

Indeed, in many industries, it is necessary to be able to check whether manufactured parts, packaging, products . . . have a leak (or otherwise formulated to check that the parts are tight) and to be able to quantify said leak.

There are different methods for detecting and quantifying leaks, such as the tracer gas method, the swimming pool (or water tank) method or the pressure variation method.

However, if the leak is correlated to a pressure difference greater than 0.1 Pa/s, then the pressure variation method is the fastest and most economical method. Indeed, unlike the tracer gas method, it is not necessary to have gas cylinders to carry out a tightness measurement. In addition, unlike the water pool method, the pressure variation method is fast and can be implemented in an industrial process (on a production line for example).

Thus, in the pressure variation method, the object to be tested undergoes a controlled pressure variation, and after a determined time (stabilisation phase), a pressure is again measured, for example in a chamber containing the object which will have varied if the object has a leak.

It is therefore critical to have a pressure sensor capable of measuring small pressure variations and therefore indirectly small leaks.

DESCRIPTION OF INVENTION

The invention is thus a new type of differential pressure sensor for a leak detection device comprising:
- at least two bodies fastened to each other in which a cavity is created;
- a membrane that is arranged between the two bodies and separates said cavity so as to define a test chamber in each one of said bodies;
- at least one electrode arranged in each one of the test chambers and facing said membrane so as to form therewith a capacitor;

characterised in that said sensor comprises at least two seals arranged between each of said bodies and the membrane.

Said seals allow to ensure the tightness of the test chambers from the outside. In addition, the seals, preferably arranged concentrically, allow to minimise any variations in the volumes of the test chambers.

According to one possible feature, each of the bodies comprises at least one fluid duct opening between said seals.

Said fluid duct opening between said seals allows in particular to vary the pressure prevailing between the seals and to balance it with the pressure prevailing in the adjoining test chamber (that is to say the test chamber whose seals ensure tightness). Thus, the inner seal, directly delimiting the test chamber, does not undergo pressure variations (and therefore does not move).

According to another possible feature, at least one of the bodies and/or the membrane comprises grooves to accommodate said seals.

It is advantageous to provide a shape (such as a groove or any other adapted shape) to house said seals, in particular to facilitate the positioning of the seals during the manufacture of said sensor, but also to limit the radial movement of said seals and optimise the sealing provided by the latter.

According to another possible feature, each of the pairs of seals is arranged on either side of the membrane.

According to another possible feature, each of the pairs of seals is in contact with the membrane and at least one body of the sensor.

According to another possible feature, at least one of said bodies comprises a member for tensioning said membrane.

Said tensioning member is in the shape, for example, of a protrusion or of a washer which bears on the membrane to tension the latter, preferably in a uniform manner.

According to another possible feature, the membrane and said bodies are made of materials having substantially equal coefficients of thermal expansion. Said materials are for example bronze, a bronze-beryllium alloy and/or stainless steel, etc.

According to another possible feature, at least one of the electrodes has, on the one hand, two opposite end faces, one facing the membrane and the other fastened to one of the bodies, and, on the other hand, a transverse face connecting said end faces.

More particularly, the electrode has a substantially cylindrical or disc shape, and is for example made of an electrically conductive material, such as brass, bronze, or a copper alloy, . . . .

According to another possible feature, at least one of the electrodes comprises a through hole whose ends open at the (opposite) end faces of the electrode.

According to another possible feature, at least one electrode comprises a transverse housing intended to accommodate an electrical contact rod.

According to another possible feature, the through hole and the transverse housing communicate, in particular fluidly, with each other.

According to another possible feature, at least one of the bodies is produced by die-stamping.

The fact of producing one of said bodies by die-stamping improves the mechanical rigidity of the part and in particular enables the sensor to withstand greater pressure values, while allowing to have less massive parts. Moreover, die-stamping is a more ecological method, because it results in less material loss than conventional machining.

According to another possible feature, said sensor comprises an electrical contact rod in contact with said electrode (in particular at the transverse housing created in the electrode).

According to another possible feature, said sensor comprises an electrical connector.

Said electrical connector is connected, on the one hand, to the electrical contact rod, and, on the other hand, to electronic entities for measuring electrical quantities, such as capacitance, resistance, etc.

According to another possible feature, said rod comprises an end having a polygonal shape, for example square or rectangular.

The polygonal shape of the end of the rod is intended to be mounted tightly (or press-fitted) into the transverse housing of said electrode and to guarantee good electrical contact between the electrode and said rod.

According to another possible feature, each of said bodies comprises a fluid channel opening into their respective test chamber.

Said channel preferably opens tangentially to the wall delimiting the test chamber.

According to another possible feature, said sensor comprises an interface part which is mounted on said bodies and which comprises fluid channels wherein at least one water trap (or water retention device) is arranged.

The invention also relates to a leak detection device, characterised in that it comprises a sensor as described above.

PRESENTATION OF THE FIGURES

The invention will be better understood, and other purposes, details, features and advantages thereof will appear more clearly during the following description of particular embodiments of the invention, given only in an illustrative and non-limiting manner, with reference to the appended drawings, wherein:

FIG. 1 is a schematic perspective representation of a differential pressure sensor according to the invention;

FIG. 2 is a sectional view of the sensor of FIG. 1;

FIG. 3 is a schematic perspective view of a sensor body of the sensor of FIG. 1;

FIG. 4 is an enlarged cross-sectional view of a portion of the sensor of FIG. 1;

FIG. 4a is an enlarged and partial view of FIG. 3.

DETAILED DESCRIPTION OF EMBODIMENTS OF THE INVENTION

FIG. 1 is a schematic perspective representation of a differential pressure sensor 1 according to the invention.

More particularly, said sensor 1 comprises at least two bodies 3a and 3b fastened to each other by fastening means 5, such as screws. The sensor 1 also comprises an interface part 6 and an electrical connector 10 which are fastened to said bodies 3a and 3b.

Each of said bodies 3a and 3b is hollowed out, such that in the mounted position said bodies 3a and 3b delimit a cavity 7 (cavity internal to said sensor), this configuration being more particularly visible in FIG. 2 which is a sectional view of the sensor 1 shown in FIG. 1.

It can also be seen in FIG. 2 that said sensor 1 comprises a membrane 9 inserted between the two bodies 3a and 3b so as to divide the cavity 7 into two sub-portions, these two sub-portions respectively each defining a test chamber 7a and 7b.

In addition, each of said bodies 3a and 3b comprises a fluid channel, respectively 8a and 8b (the latter not being shown in the figures), opening into their respective test chamber 7a and 7b (the channel 8a is more particularly visible in FIG. 3).

It will be noted that in a variant embodiment not shown, said at least one of the bodies 3a and/or 3b is produced by die-stamping.

Said channels 8a and 8b allow the entry or the evacuation of fluid respectively in the test chambers 7a and 7b.

Each of said channels 8a and 8b preferably opens tangentially to the wall of the body 3a or 3b delimiting the test chamber 7a or 7b (a flow of air opening tangentially to the wall limits the appearance of a turbulent regime, facilitating the filling and stabilisation).

The sensor 1 also includes two electrodes 11a and 11 b housed respectively in the test chambers 7a and 7b.

Said electrodes 11a and 11b are, on the one hand, arranged facing said membrane 9 so as to form therewith a capacitor, and on the other hand, fastened respectively to the bottom wall of said body 3a and 3b (the bottom wall of the housing being the wall opposite the membrane). The electrical connector 10 is, in turn, intended to transmit information relating to physical quantities of the electrodes 11a and 11b (for example electrical capacitance values) of the sensor 1 to electronic entities (not shown) capable of processing them.

The electrodes 11a and 11b, in the present embodiment, are substantially cylindrical or disc-shaped, and are for example made of an electrically conductive material, such as brass, bronze, a copper alloy . . . .

Thus, each of the electrodes 11a and 11b has two opposite end faces and a transverse face connecting said two end faces.

The electrodes 11a and 11 b are here advantageously fastened to said bodies 3a and 3b using an adapted glue (one of the end faces of the electrode is therefore glued to the bottom wall of the body). Each of the bodies 3a and 3b has a through opening 14a and 14b respectively which opens at the electrode 11a or 11 b, more particularly facing the glued end face of the electrode 11a or 11b. This configuration thus allows an operator to more easily separate the electrode 11a or 11b from the body 3a or 3b during maintenance and/or recovery operations. After checking that the electrode has been mounted correctly, said through-openings 14a and 14b are respectively closed off by a plug 15a and 15b (said plugs ensuring the tightness of said bodies).

Said sensor 1 comprises at least two sets 13 of two seals, respectively $13a_1$, $13a_2$ and $13b_1$, $13b_2$, each set of seals being arranged between one of said bodies 3a or 3b and the membrane 9.

Said seals $13a_{1-2}$ and $13b_{1-2}$, generally O-ring seals, are therefore inserted between each of said bodies 3a and 3b and the membrane 9 (therefore on each side of the membrane) to ensure the respective tightness of the test chambers 7a and 7b. More particularly, circular grooves 4 are provided in the bodies 3a and 3b to accommodate said seals $13a_{1-2}$ and $13b_{1-2}$, facilitating the mounting of the seals, but also limiting radial movement of the seals (in a variant embodiment not shown, said grooves are created in the membrane). It will thus be noted that there are two seals (or a pair of seals) $13a_{1-2}$ or $13b_{1-2}$ arranged on either side of the membrane 9. One pair of seals $13a_{1-2}$ is therefore in contact with the first body 3a, while another pair of seals $13b_{1-2}$ is in contact with the second body 3b. Thus, it is possible to define inter-seal volumes delimited by the membrane 9, one of said pairs of seals $13a_{1-2}$ or $13b_{1-2}$ and one of said bodies 3a or 3b.

Moreover, one of the bodies 3a has a member 17 for tensioning the membrane 9 (protruding from the surface of said body) which bears against the membrane 9 and puts it under tension. The membrane 9 comprises for example a groove or at least one shape cooperating with the tensioning member of the body 3a. It will be noted that said member 17 can also be a part separate from said body 3a, such as a washer which is inserted between the body 3a and the membrane 9.

Said bodies 3a and 3b, in addition to channels 8a and 8b for supplying fluid to test chambers 7a and 7b, each comprise a fluid duct, respectively 12a and 12b (the latter not being shown in the figures), which opens respectively between the seals $13a_{1-2}$ or $13b_{1-2}$. Said channels 8a, 8b and said ducts 12a and 12b are for example connected to a valve (not shown) allowing to manage the pressure variations applied to the different portions of the sensor 1.

Indeed, said channels ducts 12a and 12b allow in particular to vary the pressure prevailing between the seals $13a_{1-2}$ or $13b_{1-2}$ and to balance it with the pressure prevailing in the test chamber 7a or 7b.

It will be noted that the channels 8a and 8b can also comprise a secondary branch which opens respectively at the seal $13a_1$ and $13b_2$, the secondary branch being for example substantially perpendicular to the channel 8a or 8b (the secondary branch $8a_1$ of the channel 8a of the body 3a is more particularly illustrated in FIG. 3).

The membrane 9 and said bodies 3a and 3b are preferably made of materials with substantially equal coefficients of thermal expansion, such as bronze, a bronze-beryllium alloy and/or stainless steel, . . . .

FIG. 4 is, in turn, a schematic sectional and enlarged representation of one of the electrodes 11a of the sensor of FIG. 1, but the description below (like the preceding ones) also applies to the other electrode 11b of the sensor 1.

The sensor 1 thus comprises an electrical contact rod 21 which is inserted into the electrode 11a (or 11b) and passes through the body 3a (or 3b).

The rods 21 are preferably arranged on the same side of the sensor 1, in order to have a single electrical connector 10 (for example a card having electrical tracks) to which the rods 21 are connected, and thus limit the length of the wires and/or tracks. Indeed, the pressure difference between the two chambers 7a and 7b can cause a very small movement of the membrane 9, movement which is translated into an electrical capacitance value (expressed in farad) via the electrodes 11a and 11b. Thus, it is advantageous to have electrical circuits that are as identical and as short as possible, especially for measurements of the order of nanofarad.

More particularly, said electrode 11a comprises a through hole 22 extending from one end face 111 to the other 112 and a transverse housing 23 extending from the radial face 113 of the electrode 11a to the through hole 22 (said through hole 22 and the transverse housing 23 are therefore fluidically connected).

More particularly visible in FIG. 4a, the transverse housing 23 has different portions, the inlet 23a of the housing 23 is chamfered to guide the insertion of the rod 21 in the electrode 11a, followed by an intermediate straight portion 23b, then again with an intermediate chamfered portion 23c (acting as a physical stop) extended by a straight end portion 23d which opens into the through hole 22.

The rod 21 thus has an end 21a which is inserted into the housing 23, said end 21a has a polygonal section 211a, for example square, which is tightly mounted in the housing 23, more particularly in the right end portion 23d. It will be noted that it is advantageous for the polygonal section (section which therefore includes several edges) to be tightly mounted in a cylindrical end portion in order to ensure good electrical contact.

The end 21a of the rod 21 moreover comprises a crown 211b, arranged upstream of the polygonal section 211a, which acts as a stop by bearing against the intermediate chamfered portion 23c, moreover promoting electrical contact between said rod 21 and the electrode 11a.

The rod 21 also comprises a sleeve 21b which surrounds a portion of the rod 21 and which is intended to close off a through hole 31 created in said bodies 3a or 3b in order to be able to insert the rod 21 into one of the electrodes 11a or 11b.

Said sleeve 21b is generally made of plastic material and is fastened with glue, in order to prevent movement of the rod 21, but also to ensure the tightness of the bodies 3a or 3b.

The other end 21c of the rod 21 is, in turn, fastened to the electrical connector 10.

The interface part 6 which is mounted on said bodies 3a and 3b comprises fluid channels connected to the channels 8a and 8b created in said bodies 3a, 3b and opening into test chambers 7a and 7b. Said fluid channels of the interface part moreover comprise a water trap (or water retention device) which is arranged in said channels. It will however be noted that the interface part 6 is an optional part which allows the mounting of the sensor 1 according to the invention in leak detection devices which do not necessarily have accommodation structures adapted for said sensor (orientation of the fluid channels, electrical connectors, etc.).

Thus, when it is desired to carry out the tightness test of a part, one of the test chambers 7a and 7b is connected, via one of the fluid supply channels 8a and 8b, to a first test enclosure wherein the part to be tested is arranged and the other test chamber is connected, via the other fluid supply channel, to a second test enclosure wherein a reference part is arranged. The enclosures are exposed to a pressure variation, and after a determined duration, each of the test chambers, isolated from each other, then has different pressures if the part to be tested arranged in the first enclosure has a leak.

A higher pressure then prevails in one of the test chambers compared to the other, and there is movement of the membrane under the effect of this pressure difference.

The movement of the membrane then modifies the distance between the membrane and the electrodes arranged in said test chambers. It is thus possible to measure, via the contact rods, a variation (more particularly a difference) in the capacitance of the capacitors formed by said electrodes with the membrane. This configuration allows to measure very small movements of the membrane and therefore small pressure variations, pressure variations in turn relating to leaks (or a level of tightness of the tested part).

It is therefore critical to limit variations of the volumes of the test chambers 7a and 7b and/or variations of the volumes internal to the test chambers 7a and 7b, because these variations of the volumes can be assimilated or confused with leaks.

Thus, the fluid duct 12a or 12b arranged between the two seals, allows to equalise the pressure between the test chamber 7a and 7b and the inter-seal volume during the pressure variation applied to the part to be tested-test chamber assembly to measure a leak.

Indeed, if there is only one seal to ensure the tightness of the test chamber, during the pressure variation, one of the faces is exposed to atmospheric pressure, while the other face is under depression or overpressure relative to atmospheric pressure. This pressure difference undergone by the seal can lead to its deformation and/or its movement over long periods of time, which will lead to a modification of the volume of the test chamber (and therefore to vary the pressure prevailing in the test chamber).

Moreover, communicating the housing for accommodating the rod with the through hole, and communicating the volume located between the electrode and the bottom wall of said body and the main volume of the test chamber, allows to avoid the formation of captive or imprisoned volumes that are difficult to access. Due to their limited accessibility, these volumes can fill and/or empty slowly and may therefore cause a variation in the volume (and also in the pressure) of the test chamber, thus imitating a leak in the part to be tested and distorting the leak measurement carried out.

The invention claimed is:

1. A differential pressure sensor for a leak detection device comprising:
   at least two bodies fastened to each other in which a cavity is created;
   a membrane that is arranged between the two bodies and separates said cavity so as to define a test chamber in each one of said bodies;
   at least one electrode arranged in each one of the test chambers and facing said membrane so as to form therewith a capacitor;
   wherein said sensor comprises at least a first pair of seals and a second pair of seals arranged between each of said bodies and the membrane to ensure a tightness of each of the test chambers; and
   wherein each of the bodies comprises at least one fluid duct, opening between the seals of one of said pairs of seals, each duct allowing a pressure prevailing between a respective pair of seals to vary and to balance the pressure prevailing between the respective pair of seals with the pressure prevailing in the respective test chamber.

2. The sensor according to claim 1, wherein at least one of the electrodes has, on the one hand, two opposite end faces, one facing the membrane and the other fastened to one of the bodies, and, on the other hand, a transverse face connecting said end faces.

3. The sensor according to claim 2, wherein the at least one of the electrodes comprises a through hole whose ends open at the end faces of the electrode.

4. The sensor according to claim 3, wherein at least one electrode comprises a transverse housing intended to accommodate an electrical contact rod.

5. The sensor according to claim 4, wherein the through hole and the transverse housing communicate, in particular fluidly, with each other.

6. The sensor according to claim 1, wherein at least one of said bodies is produced by die-stamping.

7. The sensor according to claim 4, wherein when the transverse housing accommodates said electrical contact rod, said electrical contact rod is in contact with said electrode.

8. The sensor according to claim 7, wherein said electrical contact rod comprises an end having a polygonal shape.

9. The sensor according to claim 1, wherein at least one of said bodies comprises a fluid channel opening into the test chamber.

10. The sensor according to claim 1, wherein it comprises an interface part which is mounted on said bodies and which comprises fluid channels wherein at least one water trap is arranged.

11. A method of using the differential pressure sensor of claim 1, comprising using the differential pressure sensor to detect a leak.

* * * * *